(12) United States Patent
Cafarelli, III et al.

(10) Patent No.: US 6,735,629 B1
(45) Date of Patent: May 11, 2004

(54) METHOD AND APPARATUS FOR REAL-TIME PROTOCOL ANALYSIS USING AN ACTIVE AND ADAPTIVE AUTO-THROTTING CPU ALLOCATION FRONT END PROCESS

(75) Inventors: Dominick Anthony Cafarelli, III, Ossining, NY (US); Daniel Hansen, Pompton Plains, NJ (US)

(73) Assignee: Networks Associates Technology, Inc., Santa Clara, CA (US)

( * ) Notice: Subject to any disclaimer, the term of this patent is extended or adjusted under 35 U.S.C. 154(b) by 0 days.

(21) Appl. No.: 09/565,021

(22) Filed: May 4, 2000

(51) Int. Cl.[7] .................. G06F 15/173; G06F 15/16
(52) U.S. Cl. ................ 709/224; 709/233; 709/228; 709/223
(58) Field of Search ................ 709/220, 223, 709/234–236, 249, 201, 209, 225, 233

(56) References Cited

U.S. PATENT DOCUMENTS

| | | | | |
|---|---|---|---|---|
| 5,740,380 A | * | 4/1998 | LaBerge et al. | ............ 710/107 |
| 5,845,074 A | * | 12/1998 | Kobata | ....................... 709/219 |
| 5,966,381 A | | 10/1999 | Buckley et al. | ............. 370/395 |

* cited by examiner

*Primary Examiner*—Ario Etienne
*Assistant Examiner*—Hussein Chanti
(74) *Attorney, Agent, or Firm*—Silicon Valley IP Group, PC; Kevin J. Zilka; Christopher J. Hamaty

(57) ABSTRACT

In a probe system for monitoring and analyzing data flow and associated activities between devices connected in common to a point in a network, in the mode of operation, the probe's driver runs in a "Kernel mode" on Windows NT for analyzing in relatively low detail packets of data retrieved from the network, whereby programming is provided for operating the Kernel mode driver to monitor the rate of traffic or data packets entering an NIC card buffer, for causing the CPU to respond to an interrupt issued by the NIC everytime a data packet is received at a traffic rate below a predetermined threshold to access data packets entering the NIC card buffer, and to cause the CPU to respond to polling pulses at regular predetermined intervals to access data packets, when the traffic rate exceeds the predetermined threshold, for providing more CPU cycles to analyze the data packets. In another mode of operation, unanalyzed data packets are transferred to a frame memory for relatively detailed analysis via Expert Analyzer software operating the CPU in a User mode, whereby the amount of unanalyzed data in the frame memory is monitored for allocating the percent of CPU time available for Kernel mode processing in inverse relationship thereto.

30 Claims, 14 Drawing Sheets

METHOD AND APPARATUS FOR REAL-TIME PROTOCOL ANALYSIS USING AN ACTIVE AND ADAPTIVE AUTO-THROTTING CPU ALLOCATION FRONT END PROCESS

RELATED APPLICATION

The present invention is related to the inventions of U.S. Ser. No. 09/473,149, filed on Dec. 28, 1999, for "Method and Apparatus For Connection-Oriented Multiplexing and Switching Network Analysis, Management, and Troubleshooting," and to U.S. Ser. No. 09/493,918, filed on Jan. 28, 2000, for "Method and Apparatus For Real-Time Protocol Analysis Using An Auto-Throttling Front End Process", which are incorporated by reference herein to the extent they do not conflict herewith.

FIELD OF THE INVENTION

The present invention relates generally to methods and apparatus for providing network troubleshooting tools for detecting, diagnosing, and repairing network failures, and more particularly relates to a method and apparatus for dynamically optimizing the central processor unit (CPU) cycles for analyzing data retrieved from the network in a manner for eliminating system freeze (inability to move a cursor with a mouse, for example) under high network load, and for allocating CPU cycles available for USER MODE processing in an Expert Analysis configuration, and KERNEL MODE processing, when monitoring networks such as high-speed connection-oriented multiplexing and switching networks (COMSN), including Asynchronous Transfer Mode (ATM) networks, 100 mbps Full Duplex Ethernet and Gigabit Ethernet networks.

BACKGROUND OF THE INVENTION

Many different types of networks have been developed for permitting computers to communicate with each other in an organized manner. One such network for use within the same building by a plurality of computer users is known as a local area network (LAN). After the development of LAN networks, network systems were further developed for it, permitting computer users over a campus environment, such as those located in a large industrial site, to communicate with one another. To further extend to communicate across wider areas of the country or world, wide area networks (WAN) and/or ATM networks were developed. As these networks have grown in size and complexity, it became increasingly difficult to troubleshoot, maintain, and optimize the performance of such networks, particularly wide area networks.

With the invention of the World Wide Web (WWW), and the associated Internet, the complexities of maintaining such world wide advanced data communications far exceed the complexities of the largest WAN systems or networks. To improve communication over the Web or Internet, the ATM system was developed for providing technology for simultaneously transmitting data, voice and video traffic, and information over high band-width circuits. An ATM system network is one example of a high-speed connection-oriented multiplexing and switching network developed for the WWW. In the prior art, hardware has been developed for ATM systems, in conjunction with associated software platforms, to form a communications architecture based on the switching and relaying of small units of data, typically called "cells". These "cells" may also be grouped into frames or "packets". ATM systems or networks incorporate technology that advances the state-of-the-art to include a protocol structure for effectively integrating voice, data, and video over the same communications channel at virtually any speed. Other known services for providing data communication, such as the Internet, Internet protocol (IP), frame relay, Switched loci Multimegabit Data Service (SMDS), and Ethernet, cannot provide the aforesaid integration of voice, data, and video over the same communications channels, as provided by ATM-based services.

In other words, an ATM network consists of configurable networks between source devices and destination devices, with the network being formed by switches interconnected by links. Typically, cells of data which are 53 bytes in length, also grouped as packets, are routed by the switches. A virtual circuit (VC) is established between source devices and destination devices, and the cells or packets are routed across these virtual circuits. One or a plurality of links and switches typically comprise a virtual circuit. Note that a plurality of virtual circuits can be routed across a single link, the latter not being dedicated to any single virtual circuit.

Network Associates. Inc., of Santa Clara, Calif., has been in the forefront of technology for many years in developing and providing software for managing and troubleshooting computer networks. The software is known as Sniffer Software. The most recent Sniffer systems or Aft software readily permit LAN and WAN networks to be rapidly trouble-shooted for resolving problems in the associated network that are interfering with user communication within the network. Network Associates, Inc. (hereinafter NAI), has developed a Sniffer Enterprise Expert System that provides a probe for the rapid detection, diagnosis, and repair of network failures. NAI regularly publishes technical white papers on its public web site. Once accessed, the site can be searched for a listing of associated papers. Certain of these papers may be of interest relative to the present invention, and are incorporated herein as of the date of filing this Application, to the extent they do not conflict herewith.

For the purposes of this invention, a frame is a known data stream that contains a header, a trailer, and data of some type in between the header and the trailer. The combination of the header and the trailer, per frame, specifies the overall length of the frame, including the contents made up of the header and the trailer, as well as the type of data that resides between the header and the trailer within the frame. An ATM Sniffer is a newly introduced product of Network Associates, Inc. that permits a user to extract full duplex or bidirectional individual and successive frames that are being communicated between an ATM host device or switch, and an ATM network to which a number of user devices may be connected. Note that the Sniffer product simply is connected to a subsection of an ATM network, and it is not necessarily extracting frames that are being outputted by a host device (s), but frames that are being communicated over a given network path between a number of devices. Note that for the purposes of this Application, connection to an ATM network means connection to a subsection of the network. These devices are ATM devices. Note that an ATM host device can be an individual personal computer (PC) that has a special card installed in it to permit it to interface with an ATM network for the purposes of communicating data. Also, an ATM edge device is a type of server device that permits an ATM network to be connected through the device to a number of work stations, for example, or other computer devices connected into a network that is connected to the server or edge device. Note that there are a plurality of different types of ATM frames, and the present invention can be utilized with any particular type of frame through appropriate design of the software. However, the present invention is not limited to use in ATM Sniffer products, and can be applied for use in other Sniffer LAN (Ethernet, Token Ring, Gigabit Ethernet, etc.) network analyzers to optimize the allocation of CPU cycles.

In the realm of network analysis, there usually exists a passive station somewhere in the network connection that is able to see all traffic on the portion of the network to which it is connected. This is known as promiscuous mode analysis. Typically a network probe is connected to this network such that it is capable of analyzing each data event on the network. As the capacity of corporate and internet networks increase, there exists a point at which the time required to analyze a single network data event (typically a received packet) exceeds the amount of time between such network data events. Therefore, the network analysis probe must employ some method of throttling the CPU to insure that the probe does not spend all of its CPU cycles analyzing data. For this type of probe, it is usually important for it to respond to the particular user interface employed to view the data objects that are created by the network analysis component of the probe. From experiments with a 400 MHz Pentium II computer, it has been determined that 90% of the CPU cycles can be allocated to network analysis. This leaves 10% of the CPU cycles for all user interface software processes.

As previously mentioned, network analyzers are employed for use for monitoring and troubleshooting many different types of networks. Examples of such networks with analyzer probes shown installed for such monitoring and troubleshooting purposes are shown in FIGS. 1 through 3. Note that these Probes can be other than an NAI Sniffer Expert System.

In FIG. 1, an Ethernet shared media LAN (local area network) is shown to include an "Ethernet 10/100", for providing bidirectional communication between two user stations 102 and 104, a server station 106, and a printer 108, in this example. Also, an analyzer probe 110 is connected to the Ethernet 100 for monitoring and analyzing data flowing through the network 100. Note that personal computers are one example of the user stations 102 and 104, and the server 106.

In FIG. 2, two Ethernet shared media LAN networks, in this example each include three users 102, 104, and 105, and a printer 108, communicating over an Ethernet 10/100 network 100, are each connected to a common 10/100/1000 Ethernet switch 112, that in turn provides bidirectional communication with the latter via an FDX Uplink 114 (Full Duplex), to a server 116, and via a Gigabit uplink 118 bidirectional communication with a second server 120. Also as shown, in this example, an analyzer probe 122 is connected between the Ethernet switch 112 via two FDX Uplinks 114 for monitoring data flowing between Ethernet switch 112 and server 116. Similarly, another analyzer probe 124 is connected via two Gigabit Uplinks 118, as shown, for monitoring data or communication between Ethernet switch 112 and server 120.

In FIG. 3, an example is shown of use of analyzer probes 300, 302, and 303 for monitoring data communications or traffic associated with an ATM network 304. A router 306 is connected via a DS3 North American Standard Physical Transmission Interface for digital transmission using TDM (Time Division Multiplexing) operating at 44.736-Mbps to probe 300. Another DS3 physical transmission interface is used to connect probe 300 to an ATM switch 308. The ATM switch 308 is connected via an optical carrier level OC-12 having a transmission speed of 622.8 Mbps to an ATM Network 304. The network 304 is also connected via an optical carrier level signal OC3 having a transmission speed of 155.2 Mbps to probe 302, the latter also being connected by another OC-3 carrier level signal link to an ATM switch 310. The switch 310 is also connected via another standard physical transmission interface DS3 to a router 312, and via a DS1 standard physical transmission interface operating at 1.544 Mbps to another router 314. The ATM network 304 is also connected via yet another DS3 digital transmission physical interface to another ATM switch 316, the latter also being connected via a DS1 standard physical transmission interface to the analyzer probe 303. The probe 303 is connected by another DS1 digital transmission interface to yet another router 318. In the example of FIG. 3, router 312 is associated with New York City, router 314 with Baltimore Maryland, router 318 with Dallas Texas, and so forth. Note as previously mentioned that the present invention is not limited for use with ATM networks, but can be used with many different networks, for example such as other high-speed connection-oriented multiplexing and switching networks.

In summary, the network examples of FIGS. 1 through 3 are shown as examples of typical connection types that are supported by network analyzers or analyzer probes, as indicated. FIG. 1 shows a typical shared media LAN, in an Ethernet configuration. FIG. 2 is an example of the typical switched Ethernet network with a full-duplex uplink or Ethernet trunking uplink to a shared server. Lastly, FIG. 3 shows a typical ATM network carrying data between multiple WAN sites. As shown in FIG. 3, three analyzer probes 300, 302, and 303 are inserted at various points in the network to analyze full-duplex ATM links between ATM switches 308, 310, and 316, routers 306, 312, 314, and 318, and the ATM network 304.

With further reference to FIG. 3, the following table identifies the types of connections shown therein, in relation to their expected maximum event rates, respectively:

TABLE 1

| Connection Type | Speed (mbps) | Maximum Event Rate (per second) | Time per event |
| --- | --- | --- | --- |
| DS1 | 1.544 | 6666 ATM cells | 150 microseconds |
| DS3 | 45 | 210000 ATM cells | 4.8 microseconds |
| Shared LAN | 10 | 14400 packets | 69 microseconds |
| Shared LAN | 100 | 144000 packets | 6.9 microseconds |
| Full Duplex 100 | 200 | 288000 packets | 3.5 microseconds |
| Ethernet Trunking | 800 | 1152000 packets | 868 nanoseconds |
| Gigabit Link | 2000 | 2880000 packets | 350 nanoseconds |
| OC-3 | 155 | 706400 ATM cells | 1.4 microseconds |
| OC-12 | 622 | 2825600 ATM cells | 354 nanoseconds |

As shown in Table 1, the per-packet time is very short for many of the networks or network connection types. For example, for a personal computer or CPU that includes a 400 MHz microprocessor, a single instruction can be executed in 2.5 nanoseconds. Accordingly, for the fastest link or connection shown, approximately 140 CPU instructions can occur between packets, which is insufficient to permit analysis of a single packet. Accordingly, in order to provide sufficient CPU instructions to user interface components, it is necessary to provide CPU throttling of the analysis subsystem.

SUMMARY OF THE INVENTION

An object of the present invention is to provide a method and apparatus for throttling CPU cycles, when required for providing more efficient use of and a greater number of CPU cycles during times of heavy traffic on a network, for permitting an analyzer probe to monitor and analyze a greater number of data packets retrieved from the network being monitored during such times of heavy traffic or data transfer in the network. This is accomplished, in a first embodiment of the invention, through use of a method and apparatus that includes two modes of operation. The first mode of operation provides a device driver in an analyzer probe connected in a network to respond to every receive interrupt generated by a network interface adapter card buffer during times of low traffic or data transfers in the monitored network, for transferring data packets received from a receive buffer of the network interface adapter to a RAM buffer for analysis. In the second mode of operation, when the rate of traffic is greater than a preset threshold, the receive interrupts from the network interface adapter card are ignored, and replaced by polling at regular intervals of the receive buffer of the network interface adapter for transferring packets to the RAM buffer of the analyzer. Accordingly, under heavy traffic conditions, through use of the present invention, fewer packets are lost by the analyzer. In this manner, more CPU time is made available for performing processing not associated with the analyzer probe.

In a second embodiment of the invention, when the time spent by the CPU in processing received data packets, in the first or second modes of operation, exceeds a predetermined percentage of the total CPU time available between operating systems ticks, data packet processing is terminated, to free the CPU to perform other processing. In a Windows NT operating system, for example, the first and second modes of operation are operated in a Kernel mode, and when data packet processing is terminated as indicated, the CPU transfers to a User mode.

In a third embodiment of the invention operating concurrently with the first and second embodiments of the invention, whenever an Expert Analyzer Software process is activated, the percentage of CPU available time allocated to Kernel Mode processing is made dependent upon the percentage of unanalyzed data in a frame capture memory operable in a User Mode. As the percentage of unanalyzed data in the frame capture memory increases from one range to a next range, the percentage of CPU time allocated to Kernel Mode Frame Processing is progressively decreased.

BRIEF DESCRIPTION OF THE DRAWINGS

Various embodiments of the present invention are described in detail with reference to the drawings, in which like items are identified by the same reference designation, wherein.

DETAILED DESCRIPTION OF THE DRAWINGS

Figure 1:
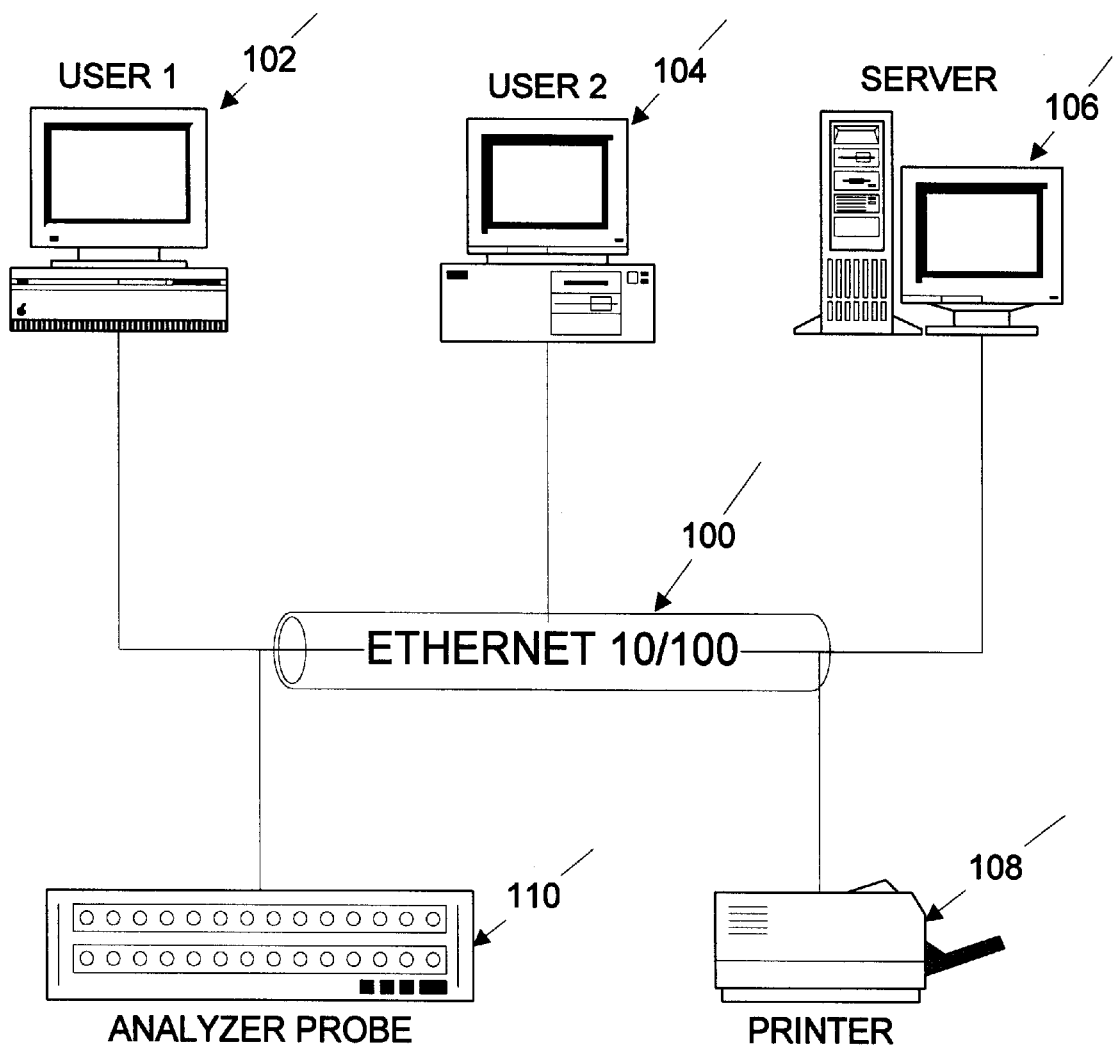
FIG. 1 shows a block schematic diagram of an Ethernet shared media LAN.
Figure 2:
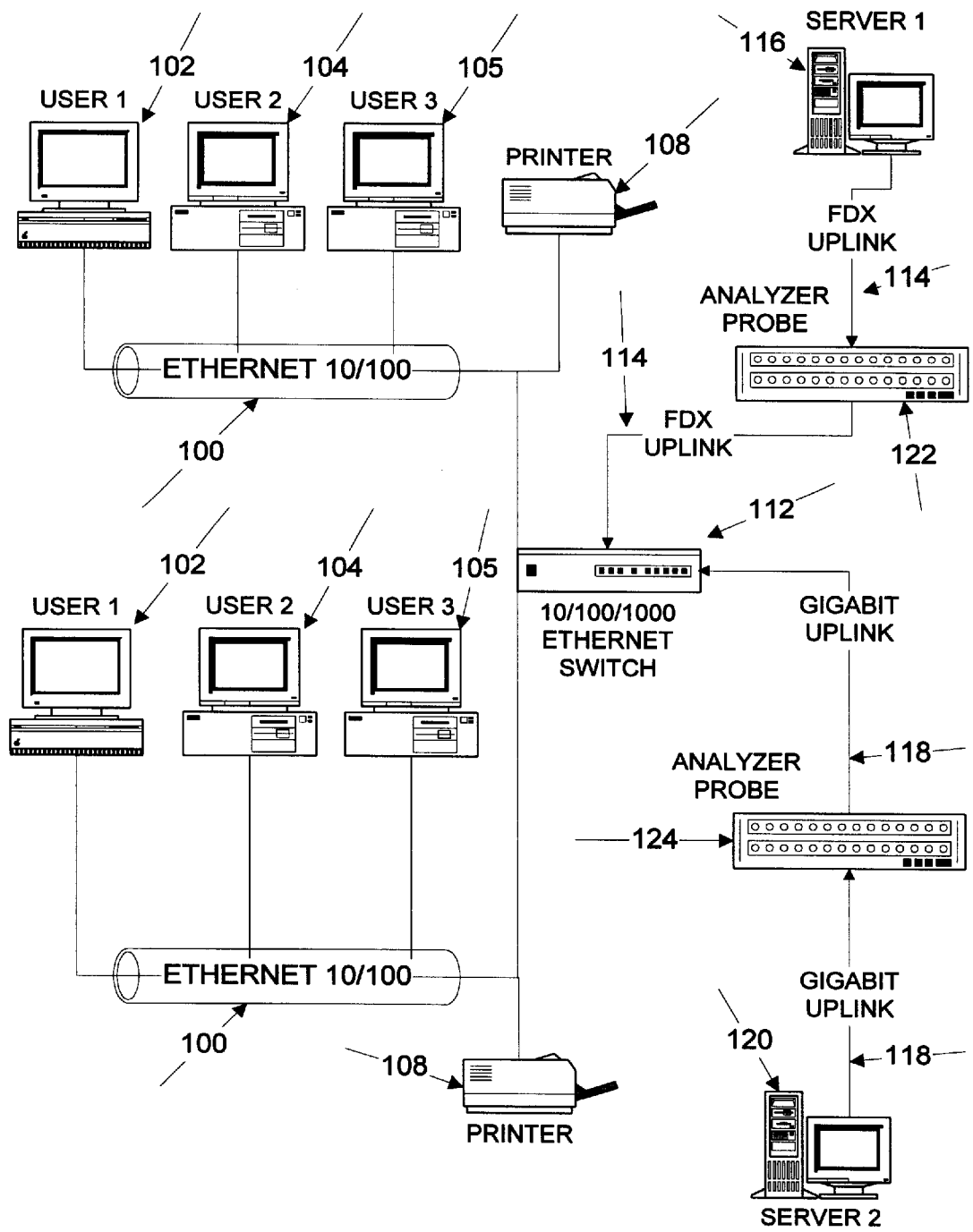
FIG. 2 is a block schematic diagram showing an Ethernet switched network with FDX and/or Gigabit Uplinks to servers.
Figure 3:
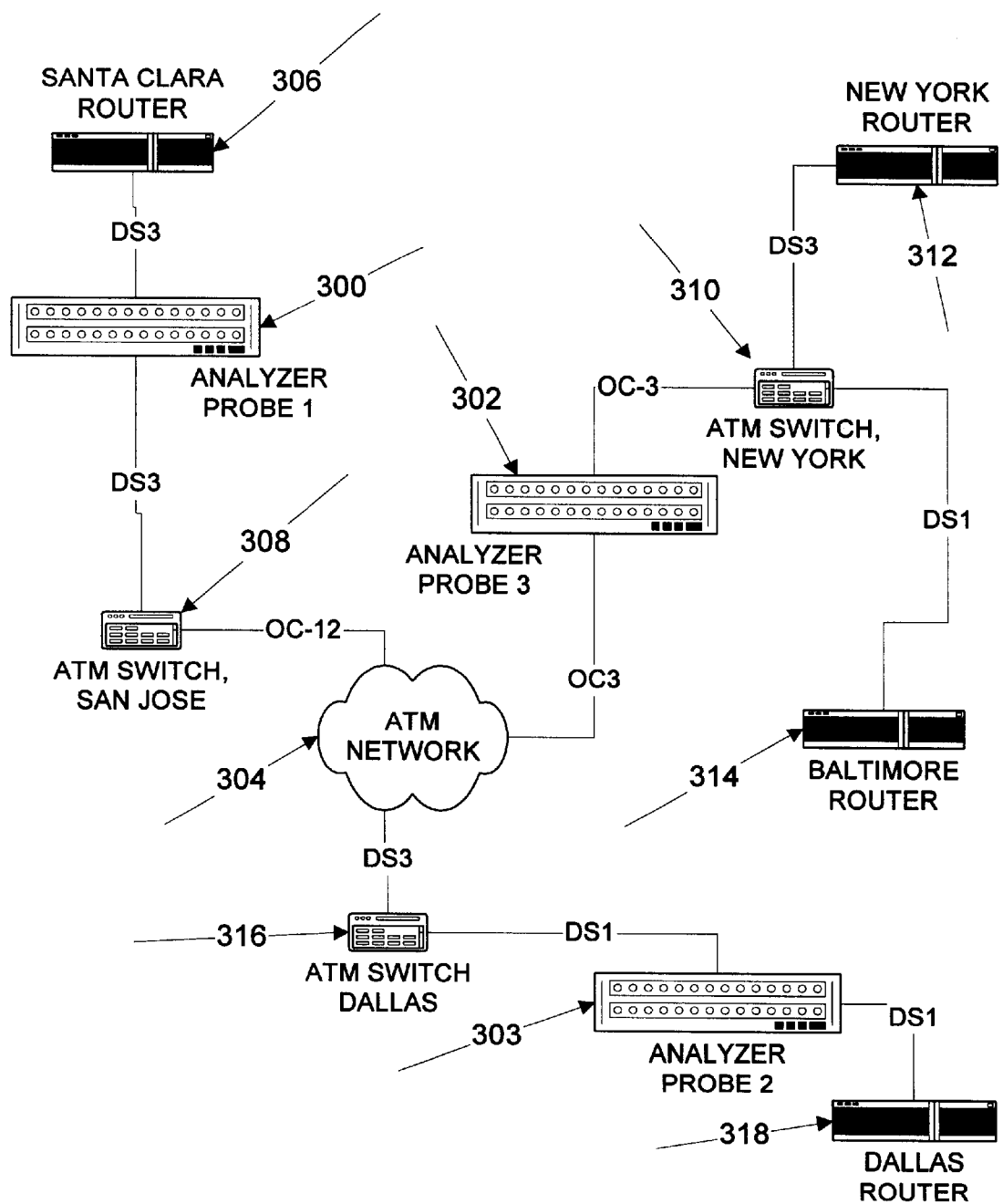
FIG. 3 is a block schematic diagram showing an ATM Network including a plurality of analyzer probes inserted at various points between users and the network.
Figure 4:
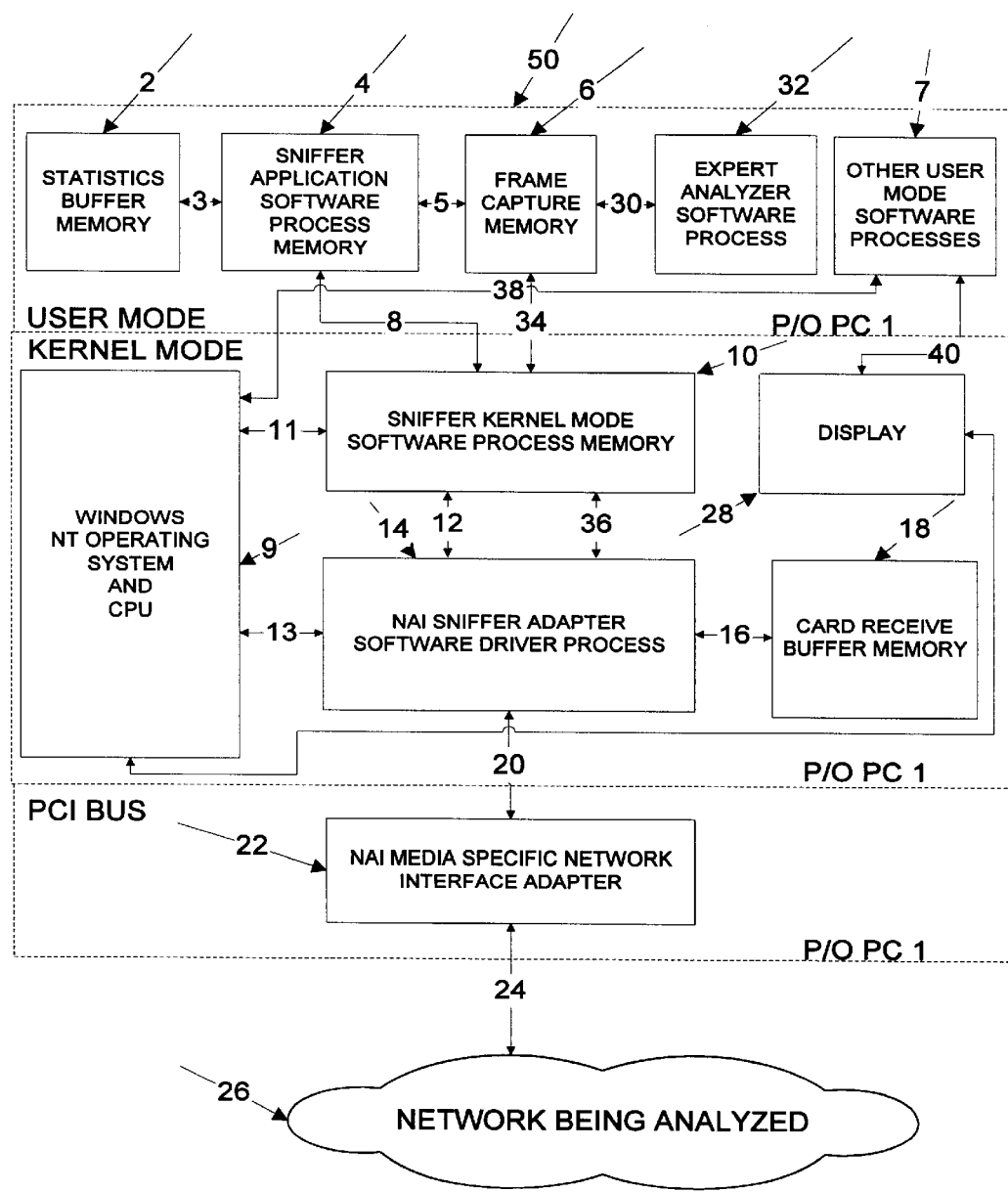
FIG. 4 shows a block schematic diagram of an NAI Sniffer System associated with various embodiments of the invention.

The description of the present invention is given for an example of use in association with a Microsoft Windows NT® operating system. However, the invention is not so limited, and can be used with any other commercially available operating system. The NAI Sniffer System, as shown in FIG. 4, will now be described in detail relative to the present invention provided via software loaded into and operated by a PC 1. PC 1 is a personal computer that includes a central processing unit (CPU) loaded with a Windows NT Operating System in this example, and designated by reference numeral 9. Computer PC 1 stores in memory 4 an NAI Sniffer Application Software Process, and Windows NT OS software (operating system) also in memory 4. An NAI Adapter Card 22 and all other processes required to support such network analysis application are also included. A statistics buffer memory 2 contains different statistics such as Host Table, Matrix Table, Protocol Distribution, Global Network Statistics, etc. A data connector 3 connects the NAI Sniffer Software Process memory 4 to the Statistics Buffer Memory 2.

The NAI Sniffer Software Process in memory 4 contains the user mode software (User Interface) to the Statistics Buffer Memory 2, and to the Frame Capture Memory 6 via data connector 5. It is also connected via data connector 8 to the NAI Sniffer Kernel Software Process Memory 10 to provide the location (memory address) of the Statistics Buffer Memory 2 and the Frame Capture Memory 6 to the NAI Sniffer Kernel Software Process Memory 10.

Frame Capture Memory 6 is a memory buffer used to save captured data frames. Other User Mode Processes 7 are other applications in the PC 1 which require some CPU 9 time to appear to be responsive to the user commands from a mouse and/or keyboard (not shown). Some of these other user mode processes also provide the capability of the Sniffer System 50 to communicate over the enterprise network to other network management stations for the purposes of sharing the collected Statistics Memory 2 and Frame Capture Memory 6.

The Other User Mode Software Processes 7 communicates with Windows NT Operating System and CPU 9 through data connector 38. In addition, the Other User Mode Software Processes 7 optionally displays information to the Display 28 during their execution. These connections provide these Other User Mode Software Programs the capability to execute within the CPU 9 and provide user feedback through the Display 28.

The Windows NT Operating System provides Application Program Interface functions available to Kernel Mode Driver programs. These services provide functions which allow Kernel Mode Driver programs the ability to allocate memory, schedule timer operations, register interrupt service routines to specific hardware device interrupts, access registers in hardware devices and other OS (operating system) related functionality used by Kernel Mode Driver programs.

NAI Sniffer Kernel Mode Software Process in Memory 10 is analysis software which updates data in a Statistics Buffer Memory 2, which contains items such as a Host Table, Matrix Table, and Protocol Distribution objects, and provides Real-Time filtering, triggering, and optionally saves selected data by transfer to the Frame Capture Memory 6. A data connector 11 provides NAI Sniffer Kernel Software Process Memory 10 access to the Windows NT Operating System and CPU 9.

A data connector 12 provides the control and data flow between the NAI Sniffer Kernel Process Memory 10, and the NAI Sniffer Adapter Software Driver Process 14. This provides the ability for the NAI Sniffer Adapter Software Driver Process 14 to inform the NAI Sniffer Kernel Mode Software Process Memory 10 of received data from the network 26 under analysis.

A data connector 13 provides NAI Sniffer Adapter Software Driver Process 14 the access to the Windows NT Operating System and CPU 9. The NAI Sniffer Adapter Software Driver Process 14 consists of software responsible for supporting the NAI Media Specific Network Interface Adapter card 22. This software process must allocate the Card Receive Buffer Memory 18. It will program the NAI Media Specific Network Interface Adapter 22 with the location of the Card Receive Buffer Memory 18, and will accept interrupt notification from the NAI Media Specific Network Interface Adapter 22 when data has been received in the Card Receive Buffer Memory 18. When data is received, the NAI Sniffer Adapter Software Driver Process 14 will indicate receipt of the data to the NAI Sniffer Kernel Mode Software Process Memory 10. Note that the Network Interface Adapter card 22 is known also as NIC card 22, and in certain applications may include the card receive buffer memory 18.

A data connector 16 connects the Card Receive Buffer Memory 18 to the NAI Sniffer Adapter Software Driver Process 14. The Card Receive Buffer Memory 18 is a data memory allocated by the NAI Sniffer Adapter Software Driver Process 14 for purposes of direct access by the NAI Media Specific Network Interface Adapter card 22.

A data connector 20 provides the bus access between the NAI Sniffer Media Specific Network Interface Adapter 22 and the Driver 14. Data connector 20 provides the electrical connection and appropriate signaling for this connection. Typical bus architectures are PCI, CardBus and ISA. Data connector 20 allows PCI Bus-Mastering support which allows the NAI Media Specific Network Interface Adapter 22 to directly write received packet data into Card Receive Buffer Memory 18. It allows the NAI Sniffer Adapter Software Driver Process 14 to directly access the device registers (not shown) on the NAI Media Specific Network Interface Adapter 22. It also allows the NAI Sniffer Media Specific Network Interface Adapter 22 to interrupt the CPU 9 to indicate events to the NAI Sniffer Adapter Software Driver 14 process.

The NAI Sniffer Media Specific Network Interface Adapter 22 is one of several hardware devices manufactured by NAI or an NAI OEM supplier. There are different adapters which support different network topologies (ATM, Ethernet, FDDI, Gigabit Ethernet, etc). The network connection 24 provides a cable or fiber optical cable connection to the network 26 being analyzed. The network 26 being analyzed is a given network to be analyzed by the NAI Sniffer System. Examples of the types of Networks supported are as follows: ATM, Ethernet, WAN, Frame Relay, FDDI, Gigabit Ethernet, and Token Ring.

The CPU throttling of the present invention is illustrated for use in a Sniffer System 50 which operates within the Microsoft Windows NT operating system. As previously described, the OS (operating system) provides services which driver programs use to support network devices. As shown, the typical network device is a PCI Bus-mastering network adapter. Interface adapters which are classified as PCI Bus-Mastering devices have the following properties. First, they conform to the PCI Version 2.1 specification of the PCI Special Interest Group. This Group defines a standard method for the electrical and mechanical connections into a standard PC platform. This PCI Bus allows the CPU and its Local Memory to communicate with devices. Secondly, a PCI Bus-Mastering device has the capability to request access to the PCI Bus to become a bus master controller, which allows that device to directly access the CPU's Local Memory, whenever the device needs to read data from local memory or to write data to local memory. This capability provides the most efficient data transfers between devices and CPU 9 local memory on a PCI bus.

A broad description of the control flow of the program during initialization and receive data processing will now be provided for one embodiment of the invention. The first two steps occur during initialization, and the last three steps occur during receive data processing. The steps are as follows:

1. The NAI Sniffer Adapter Software Driver Process 14 allocates the Card Receive Buffer Memory 18 for received data.
2. The NAI Sniffer Adapter Software Driver Process 14 programs the registers in the NAI Sniffer Media Specific Network Interface Adapter 22 to DMA (direct memory access) received data to the Card Receive Buffer Memory 18.
3. The NAI Sniffer Media Specific Network Interface Adapter 22 receives data from Network 26, and begins to DMA (direct memory access) the received data to the Card Receive Buffer Memory 18.
4. The NAI Sniffer Media Specific Network Interface Adapter 22 informs the NAI Sniffer Adapter Software Driver 14 of the received data through a Hardware Interrupt to the CPU processor 9.
5. The NAI Adapter Software Driver 14 processes the received data and informs the NAI Sniffer Kernel Mode Software Process in Memory 10 of the received data for analysis transferred to Statistics Buffer Memory 2, and an optional copy to the Frame Capture Memory 6.

As described previously, these steps can consume significant CPU processor 9 time when the network 26 being analyzed is loaded at the maximum. Therefore, the present invention provides a method of CPU throttling for employment by the NAI Sniffer Adapter Software Driver 14 (or in other network monitoring and analysis Systems) to limit the percentage of CPU processor 9 time dedicated to such processing. In addition, the present invention provides a method of reducing interrupt overhead by programming the NAI Media Specific Network Interface Adapter 22 to not generate interrupts for received data when the total number of received events exceeds a threshold.

With reference to the flowcharts of FIG. 5 through 11, the CPU active throttling method of the present invention will be described in greater detail. The following parameters are specified to the CPU Throttling implementation. These parameters are provided to control the CPU throttling based upon user input, or experimental data. They are as follows below in Table 2.

TABLE 2

| Parameter Name | Size | Description |
| --- | --- | --- |
| ulCpuPercentage | 32 Bits | This is an integer number from 0–100 indicating the total percentage of the CPU time which shall be dedicated to receive processing. |
| ulIntrEnableThreshold | 32 Bits | If the total number of packets received during an Operating System Tick interval which is normally 10 ms is less than this number, the receive interrupt will be re-enabled. |
| ulIntrDisableThreshold | 32 Bits | If the total number of packets received during an Operating System Tick interval which is typically 10 ms is greater than this number, the receive interrupt will be disabled. |

Variable naming conventions used in various embodiments of the invention are defined as follows:
 "ulVariableName" is the name of a variable which is an unsigned long integer 32 bits in length. This value will accept a hexadecimal integer number from 0 to 0xFFFFFFFF.
 "ullVariableName" is the name of a variable which is an unsigned longlong integer 64 bits in length. This value will accept a hexadecimal integer number from 0 to 0xFFFFFFFFFFFFFFFF.
 "bVariableName" is the name of a BOOLEAN variable which can be either TRUE or FALSE.

A driver program creates a function that samples an Intel Pentium processor's internal real-time clock register, for example, such as CPU processor 9. This real-time clock is incremented by the Intel Pentium processor at an interval of once per processor clock. (For example, the clock is incremented every 1/400,000,000 second for a Pentium system configured to run at 400 MHz). This function is named "GetProcessorTick( )".

A driver program defines a variable "ulSystemTicks" which is incremented once per System Tick. Note that a "tick" is the minimum resolution of a timer, for each occurrence of the associated timing pulse. As will be described in detail with reference to FIG. 9, in step 904 this variable "ulSystemTicks" is incremented once per OS (operating system) system tick. A function named "GetSystemTick( )" will return the value of this variable.

Figure 5:
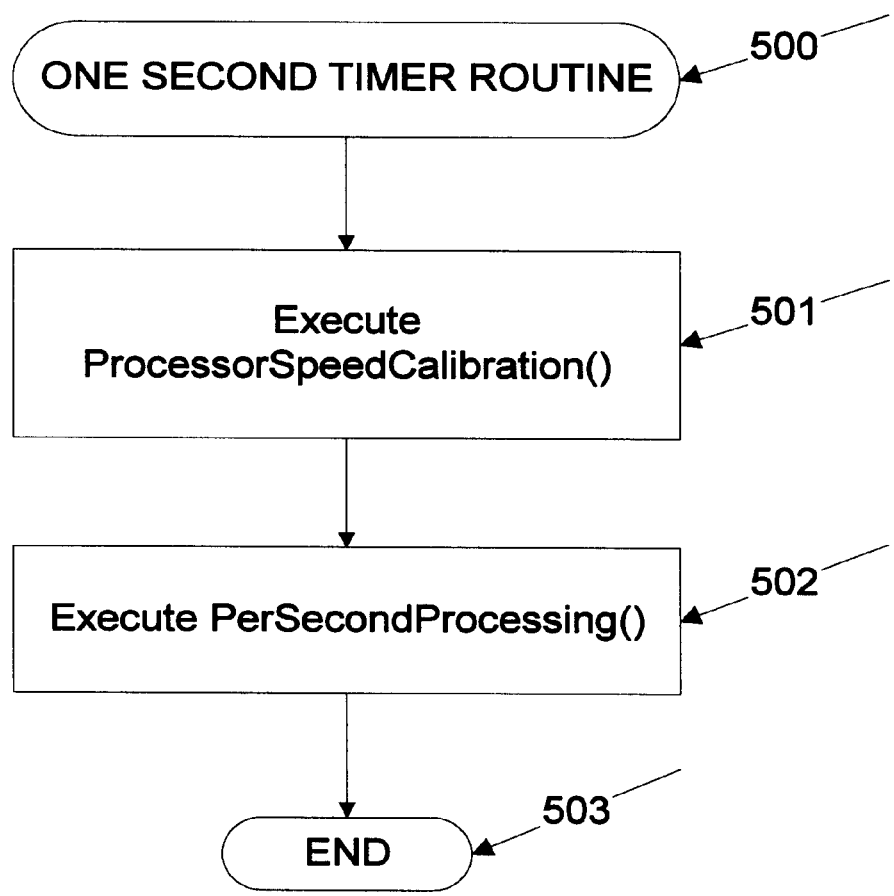
FIG. 5 shows an NAI Sniffer Adapter Driver flowchart for one embodiment of the invention.

As shown in FIG. 5, the NAI Sniffer Adapter Driver 14 registers a function OneSecondTimer( ) in steps 500 and 501, with Windows NT Kernel to be called at one second intervals in step 502. This function performs two tasks: Processor Speed Calibration, and Per Second statistics.

Figure 6:
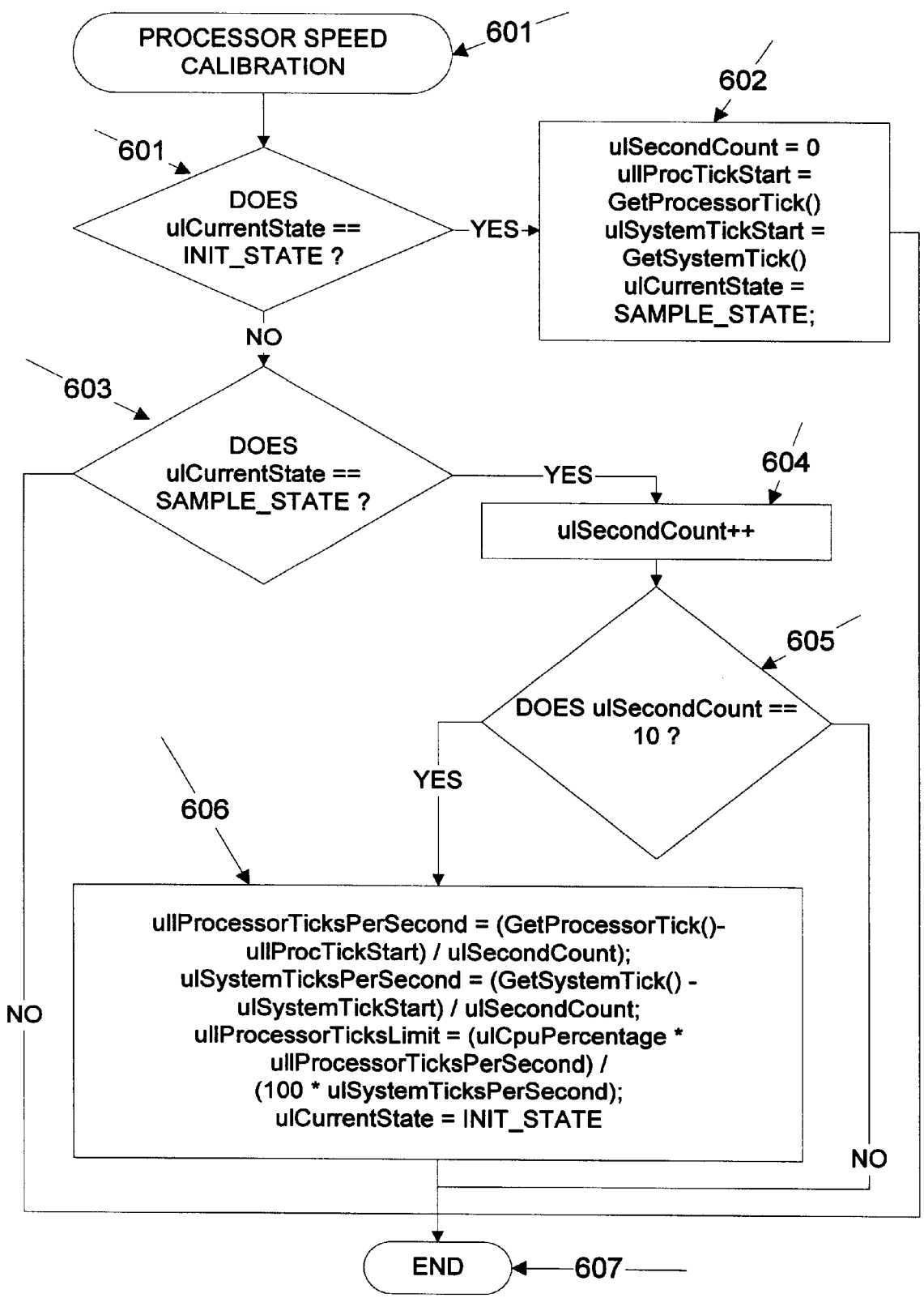
FIG. 6 shows a flowchart of the steps associated with the embodiment of the invention for processor speed calibration.

With reference to the flowchart of FIG. 6, the Processor Speed Calibration 600 is defined by steps 601 through 607. This processing or software routine calibrates the system CPU processor 9. This routine samples the current processor tick and current system tick over a period of five to sixty seconds, for example. The function employs a state based algorithm to detect the ullProcessorTicksPerSecond (64 bit variable) and the ulSystemTicksperSecond (32 bit variable). It does this by reading the current processor tick and system tick at the beginning of a five to sixty seconds sample period as shown in step 602, for example. At the end of this period, the current per-second values are calculated from the sample data. This is shown by step 606. During this processing, the value (ullProcessorTicksLimit) is calculated utilizing the above calculated values and the value stored in the controlling variable called ulCpuPercentage. This value ullProcessorTicksLimit is used by the CPU Throttling loop defined in step 1005 of the flowchart in FIG. 10. This limits the total number of processor ticks that can be consumed by per-packet received processing for each system tick. In other words, the number of processor ticks between system ticks. As shown by step 606 in FIG. 6, the formula for Processor Ticks Limit is defined by:

(ullProcessorTicksPerSecond*ulCpuPercentage)/(ulSystemTicksPerSecond*100). As previously described, from experimentation, the ulCpuPercentage control variable has been determined to be optimal at 90 (configuration for 90 percent). In other words, when the time spent by the CPU 9 in processing received data packets exceeds 90% of the CPU time available between operating systems ticks, data packet processing is terminated, and the CPU 9 is transferred to User mode processing from a Kernel mode. Note that although 90% is preferred, any other percentage value can be used, depending upon the application. Also, note that Kernel mode processing has a higher priority than User mode processing.

Figure 7:
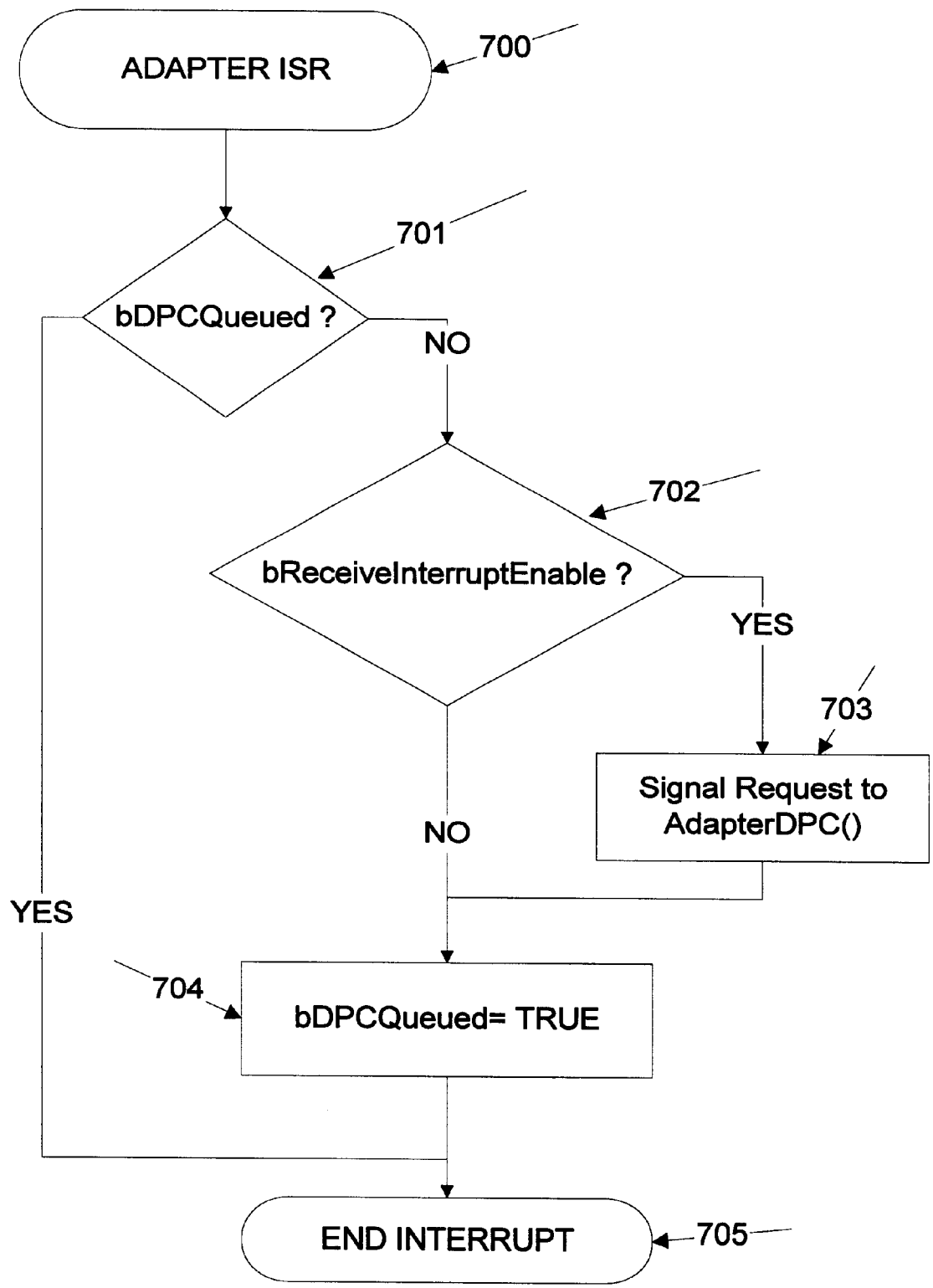
FIG. 7 is a flowchart showing the steps for a procedure for the NAI Sniffer Adapter Driver for one embodiment of the invention.

As shown in FIG. 7, the NAI Sniffer Adapter Software Driver 14 is programmed to create a procedure called AdapterISR( ) shown as step 700, which gets called by Windows NT programming of CPU processor 9 once per interrupted event as triggered by the NAI Sniffer Media Specific Network Interface Adapter 22, for carrying out steps 701 through 705 when one of the following events occurs:
 1. Received Packet
 2. Transmitted Packet
 3. Physical Layer Notification
 4. ASIC Management Notification For the purposes of this description, only the Received Packet events will be documented. All other events occur at very low frequency. Therefore, their action is simply processed under normal conditions without being controlled or throttled by the methods and procedures defined herein. However, given that received packets are expected to occur at very high rates, the received packet event is processed differently. This function will execute at the Microsoft Windows NT priority level known as DIRQL_LEVEL. When this function executes and determines that the source of the interrupt is a received event, it signals to the Windows NT OS to queue the Adapter driver DPC for execution by the CPU 9. The AdapterDPC( ), a DPC (Deferred Procedure Call) as defined by the flowchart in FIG. 8 will be queued.

Figure 8:
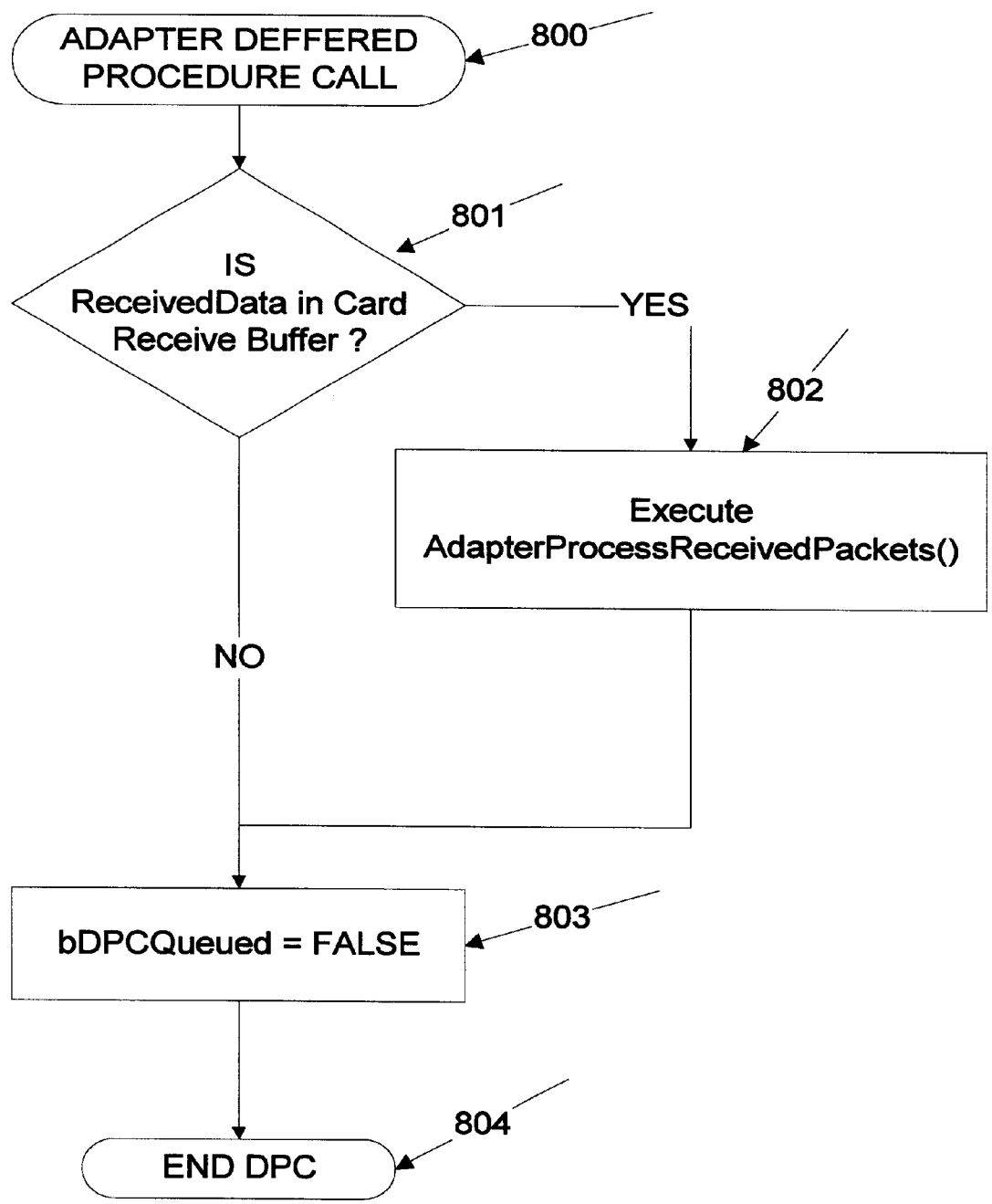
FIG. 8 is a flowchart for the NAI Sniffer Adapter Driver for an Adapter Driver Deferred Procedure Call for an embodiment of the invention.

As shown in FIG. 8, the NAI Sniffer Adapter Software Driver 14 creates a function AdapterDpc( ), shown by step 800, that gets called by Windows NT OS at the request of the AdapterISR( ). This function will execute at the Microsoft Windows NT priority level known as DISPATCH_LEVEL.

Figure 10:
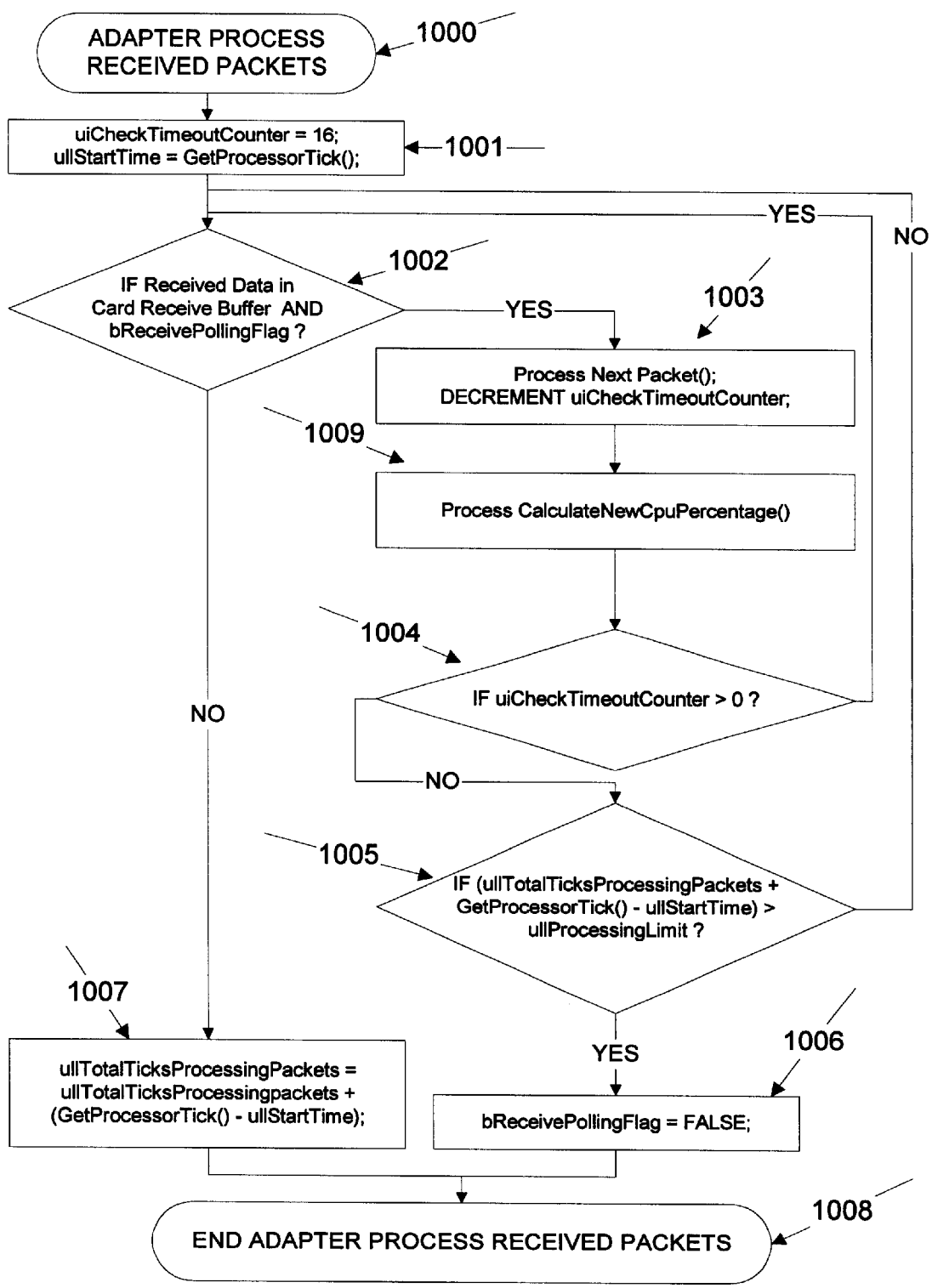
FIG. 10 shows a flowchart for the NAI Sniffer Adapter Driver for active and adaptive embodiments of the invention to create an AdapterProcessReceivedPackets( )

This DPC (Deferred Procedure Call) will call the AdapterProcessReceivedPackets( ) function described by the flowchart in FIG. 10.

Figure 9:
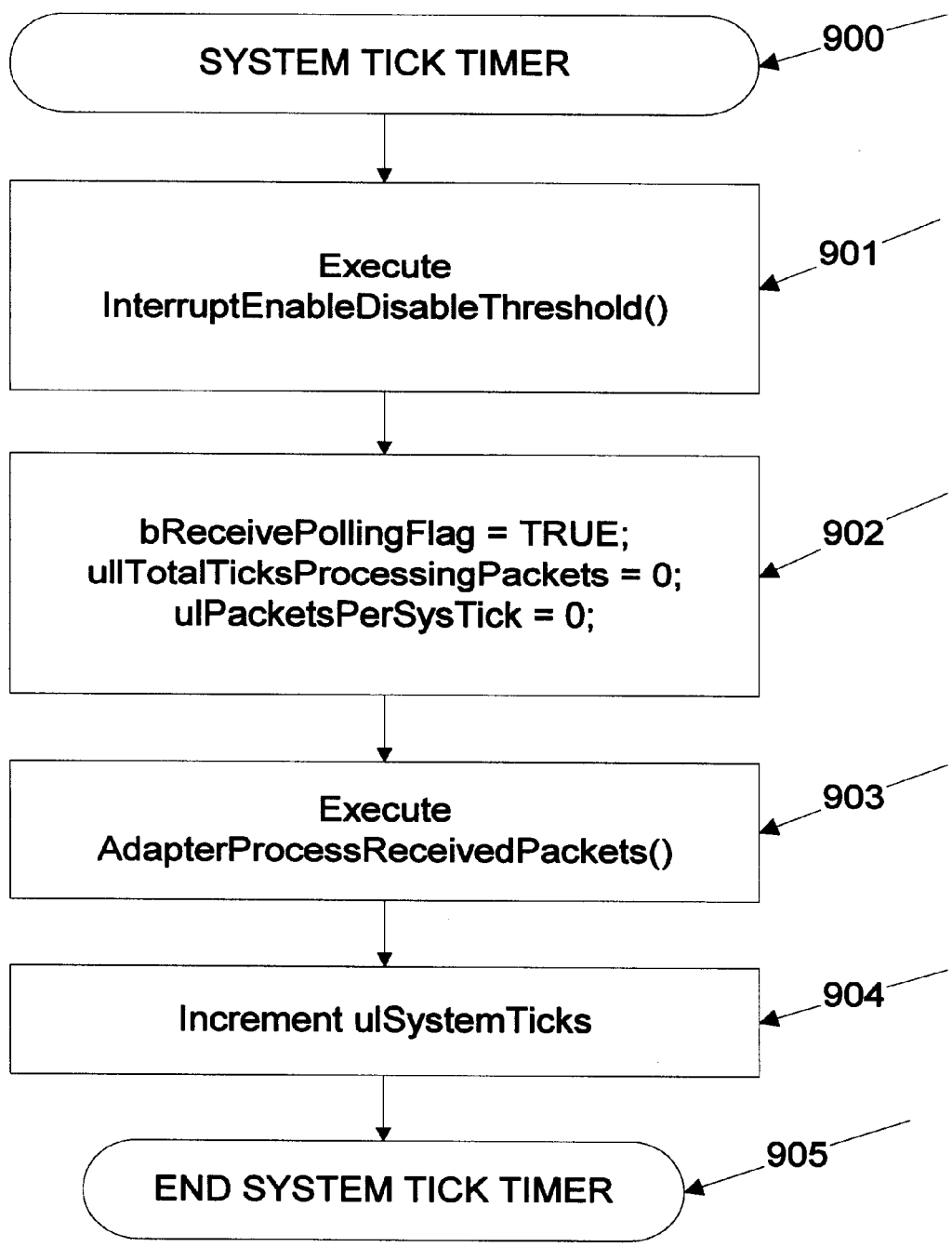
FIG. 9 shows a flowchart for the NAI Sniffer Adapter Driver to provide an implementation of processing performed by a System tick timer( ) for an embodiment of the invention.

As shown in FIG. 9, the NAI Sniffer Adapter Driver creates a function called SystemTickTimer( ) denoted by step 900. It registers this function with Windows NT OS. This function is called once per operating system tick. As previously described, this time period is approximately 10 ms in the Windows NT OS. As shown, a ulSystemTick variable is maintained for the GetSystemTick( ) function described earlier relative to the flowchart of FIG. 6.

As shown in FIG. 9, the InterruptEnableDisableThreshold( ) process step 901 (described by flowchart of FIG. 11) is called once per Windows NT system tick to perform Interrupt Enable/Disable processing. As shown in steps 901–905, the AdapterProcessReceivedPackets( ) process step 903 (described by flowchart of FIG. 10) is called once per Windows NT system tick to process received packets when the Receive Interrupt is disabled by the InterruptEnableDisableThreshold( ) process step 901.

As shown in FIG. 10, the NAI Sniffer Adapter Software Driver Process 14 creates a function known as AdapterProcessReceivedPackets( ) denoted by step 1000. This function will process, via steps 1001 through 1008, all received data which has been placed in the Card Receive Buffer 18 by the NAI Sniffer Media Specific Network Interface Adapter 22. The function 1000 is called either from the DPC (Deferred Procedure Call) 800 during interrupt processing, or from the SystemTickTimer( ) function 900 during receive polling when the receive interrupt is disabled. When this function executes, it will process data until there no longer is data to be processed or until the throttling code described in steps 1005 and 1006 disables the bReceivePollingFlag.

Figure 11:
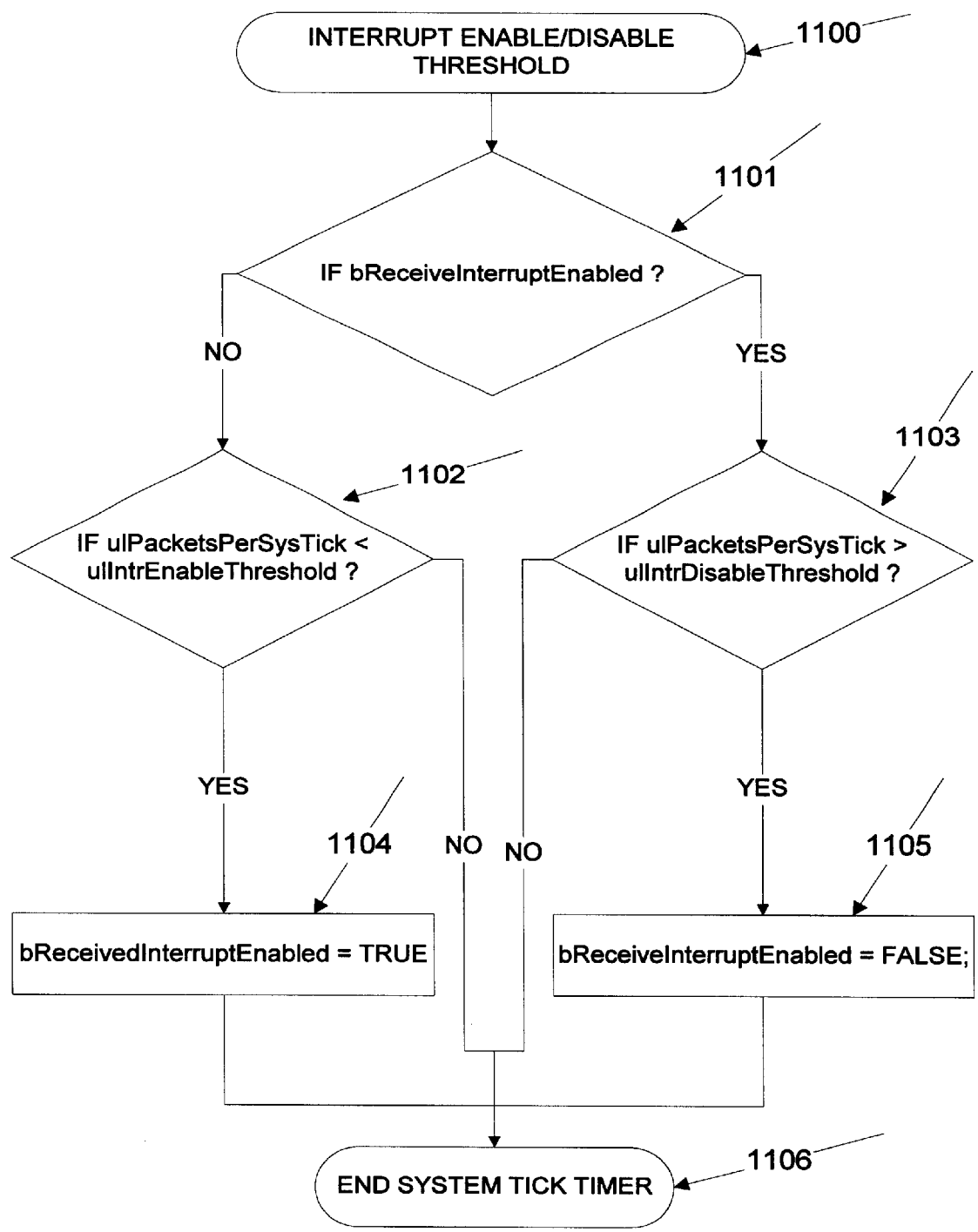
FIG. 11 shows a flowchart for another embodiment of the invention for the NAI Sniffer Adapter Driver for generating an InterruptEnableDisableThreshold( ).
Figure 12:
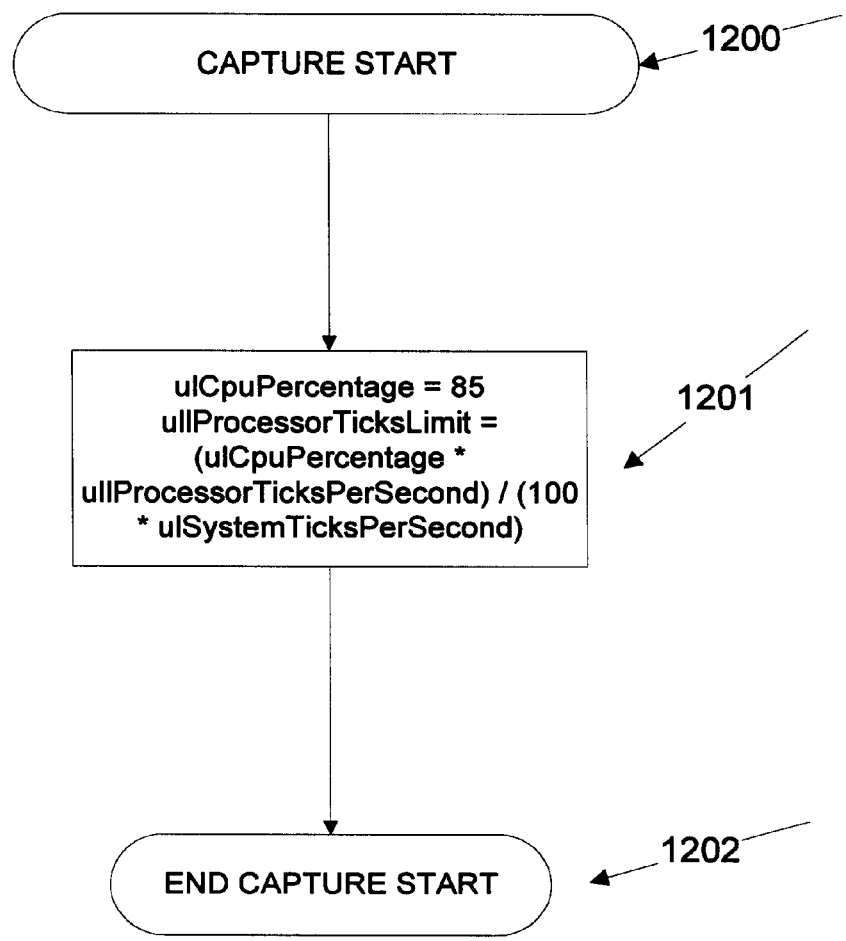
FIG. 12 shows a flowchart for yet another embodiment of the invention, for Kernel Mode Frame processing, when an Expert Analyzer Software process is enabled during a Frame Capture Memory capture routine.

As shown in FIG. 11, the NAI Sniffer Adapter Software Driver 14 creates a function known as InterruptEnableDisableThreshold( ) denoted by step 1100. This function will determine if the receive interrupt shall be enabled or disabled dependent upon the total number of packets received during the time period of the last system tick (as previously defined is typically 10 ms). The algorithm of steps 1101 through 1106, describes a method to reduce the total number of interrupt notifications that will occur. This states that if the total number of packets received during a single NT system tick exceeds a specified threshold, then receive interrupt notification will be disabled. When the number of packets received during a single NT system tick falls below another threshold, then the receive interrupt notification will be re-enabled. This reduces interrupt overhead experienced during high network load.

The Expert Analyzer Software Process 32, shown in FIG. 4, is a software process which is executed only when a Frame Capture Memory 6 session is in process. The data to be analyzed is placed into the Frame Capture Memory 6 by the Sniffer Kernel Mode Software Process during Kernel Mode processing for each interrupt or polling cycle of a received packet. When User Mode processing is restored, the Expert Analyzer Software Process 32 if enabled, will analyze that frame, and perform other programmed steps. The problem to be solved is under high network load. When high network load occurs on the network being analyzed 24, then the CPU 9 will dedicate all of its CPU cycles to the Kernel Mode frame processing by the Sniffer Kernel Mode Software Process and the NAI Sniffer Adapter Software Driver Process 14. This allocation starves the Expert Analyzer Software Process 32 from having sufficient CPU cycles to analyze the data in the Frame Capture Memory 6. The methods and procedures described herein for a third embodiment of the invention, adaptively allocate the total number of CPU cycles to be shared between the Sniffer Kernel Mode Software Process, the NAI Sniffer Adapter Software Driver Process 14, and the Expert Analyzer Software Process 32. The total number of CPU cycles consumed by the Sniffer Kernel Mode Software Process 10 and the NAI Sniffer Adapter Software Driver Process 14 are "Throttled" by the percentage of unanalyzed data in the Frame Capture Memory. Therefore, when the Frame Capture Memory 6 starts to get full, then the Expert Analyzer Software Process 32 will receive more CPU Cycles for analyzing the data placed into the Frame Capture Memory 6. Likewise, as the Frame Capture Memory 6 data is depleted, the Expert Analyzer Software Process 32 available CPU cycles are reduced, corresponding to its reduced workload. The Sniffer Kernel Mode Software Process 10 and the NAI Sniffer Adapter Software Driver Process 14 will consume additional CPU cycles for updating the data in the Statistics Memory Buffer 2 from data received by the Network Being Analyzed 26.

More specifically, with further reference to FIG. 4, the Expert Analyzer Software Process 32 is a process running in User mode having lower priority to the processes associated with the Kernel Mode. The Expert Analyzer Software Process 32 monitors the data in the Frame Capture Memory 6 via data connector 30. When there is unanalyzed data in the Frame Capture Memory 6, the Expert Analyzer Software Process 32 will analyze that data. The Sniffer Kernel Mode Software Process in Memory 10 and CPU 9, via data connector 34, monitor the total amount of unanalyzed data in the Frame Capture Memory 6 remaining for analysis by the Expert Analyzer Software Process 32. The Sniffer Kernel Mode Process functions, via CPU 9 and Memory 10, calculate the amount of unanalyzed data as a percentage of the total storage capability of the Frame Capture Memory 6. Using the following Table 3, the Sniffer Kernel Mode Software Process determines the total amount (in percentage) of the CPU 9 to be allocated to Kernel Mode frame processing by the NAI Sniffer Adapter Software Driver Process 14. The CPU 9 Percentage allocation is provided from Memory 10 to NAI Sniffer Adapter Software Driver Process 14 via data connector 36.

TABLE 3

| Percentage of Unanalyzed Data in the Frame Capture Memory | CPU Percentage Allocated to Kernel Mode Frame Processing |
| --- | --- |
| 0–10% | 85% |
| 10–50% | 50% |
| 50–75% | 30% |
| 75–90% | 15% |
| 90–100% | 10% |

This table represents an example of the method of calculating the total CPU Percentage Allocated to Kernel Mode Frame Processing which is dependent upon the Percentage of Unanalyzed Data in the Frame Capture Memory 6. Other calculation algorithms can be employed with finer resolutions. In addition, different percentages can be employed to further optimize the effectiveness of this algorithm.

Referring to FIG. 10, an additional step 1009 may occur after each Frame is processed by step 1003 of the AdapterProcessReceivedPackets 1000 function. This step occurs during Kernel Mode processing upon the concurrence of the Kernel Mode Process placing data into the Frame Capture Memory 6, and the Expert Analyzer Software Process 32 being enabled, whereby step 1009 is executed via the routine or steps shown in the flowchart of FIG. 13. Otherwise, step 1009 is bypassed, and step 1004 is entered.

Figure 13:
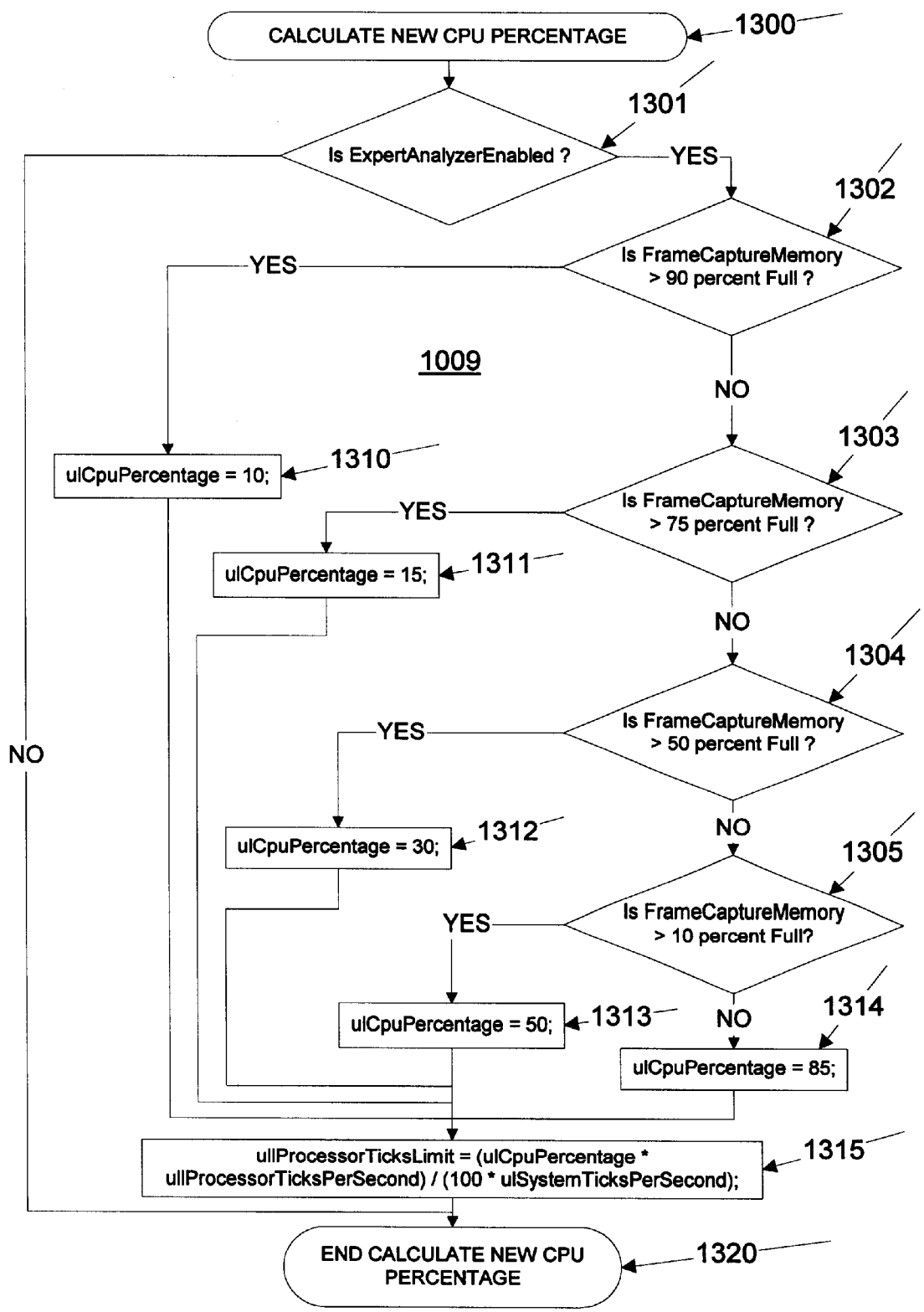
FIG. 13 shows a flowchart for a subroutine for the step in the flowchart of FIG. 10 for calculating the percent of CPU time allocated for Kernel Mode processing.

The flowchart of FIG. 13 shows the steps taken when the user requests that a Frame Capture Memory 6 session be started. This occurs to reduce the total CPU 9 percentage allocated to Kernel Mode Frame processing from 90% to 85%. This CPU 9 Processing allocation has been experimentally determined to be the optimal starting point when a Frame Capture Memory 6 session is in progress. Step 1201 describes the algorithm used to set the current ulCpuPercentage to 85% and to calculate the maximum number of processor ticks which shall be consumed for each system tick by Kernel Mode Frame processing.

The flowchart of FIG. 13 shows the steps taken for each frame processed by Kernel Mode Frame processing when the Expert Analyzer Software Process 32 is enabled during a Frame Capture Memory 6 capture session. The decision step 1301 determines whether the Expert Analyzer Software Process 32 and the Frame Capture Memory 6 session is enabled. If the answer is "yes", then the current percentage of the total Frame Capture Memory 6 which has yet to be analyzed by the Expert Analyzer Software Process is calculated. Steps 1302 through 1305 select the range of this percentage, as shown, dependent upon the percent of total storage space occupied by unanalyzed data in the frame capture memory 6. Note that in this example, the first decision step 1302 determines whether Frame Capture Memory 6 is greater than 90% full. The second through fourth decision steps 1303 through 1305 determine whether the Frame Capture Memory 6 is greater than 75%, or 50%, or 10% full, respectively. This configuration is preferred to insure that the total number of CPU 9 cycles consumed is minimized when the unanalyzed data occupies a greater percentage of Frame Capture Memory 6. Given the percentages specified in steps 1302–1305, steps 1310–1314, respectively, as shown select the appropriate value for ulCpuPercentage based on the table specified above. Step 1315 calculates the maximum number of processor ticks which shall be consumed for each system tick by Kernel Mode Frame processing, dependent upon the previously determined ulCpuPercentage, as described above.

Figure 14:
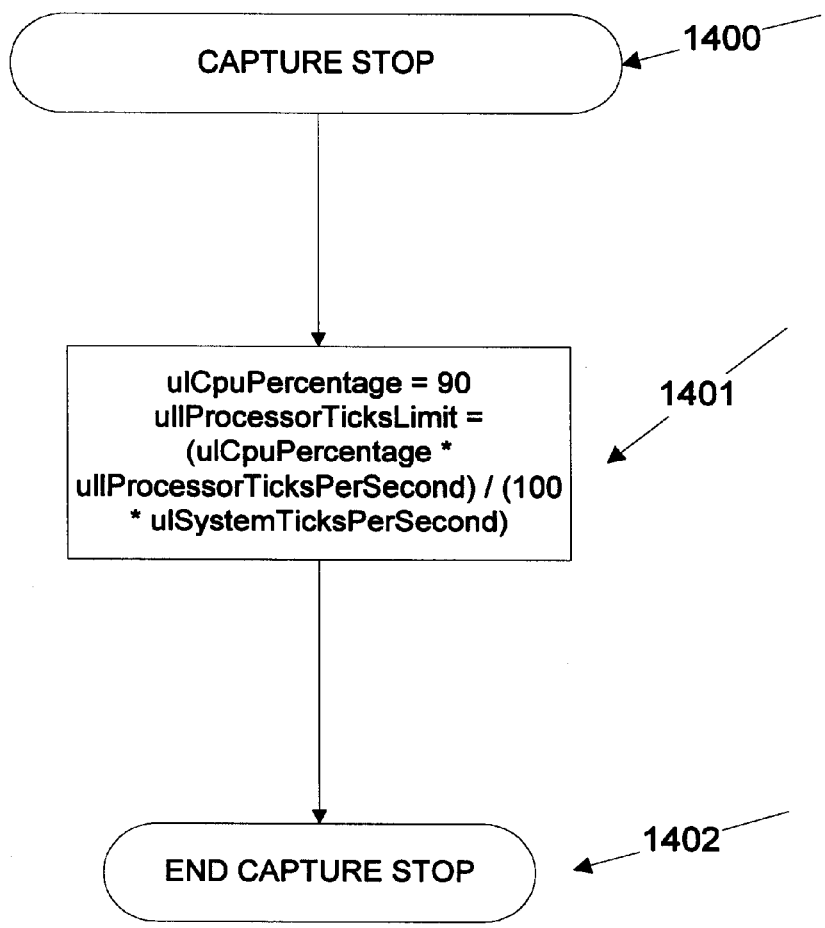
FIG. 14 shows a flowchart for the programming steps taken in response to a user requesting termination of a Frame Capture Memory session or routine.

The flowchart of FIG. 14 describes the steps taken when the user requests that a Frame Capture Memory 6 session be terminated. This routine is necessary to insure that the CPU 9 percentage allocated to Kernel Mode Frame processing is returned to 90%. In this in manner, the CPU percentage for a non Frame Capture Memory 6 session or routine is restored. Step 1401 describes the algorithm used to set the current ulcpuPercentage to 90%, and to calculate the maximum number of processor ticks which shall be consumed for each system tick by Kernel Mode Frame processing.

Although various embodiments of the invention have been shown and described they are not meant to be limiting. Those of ordinary skill in the art may recognize certain modifications to these embodiments, which modifications are meant to be covered by the spirit and scope of the appended claims.

What is claimed is:

1. A method for monitoring and analyzing data flow at a point in a network to which a plurality of devices are connected, said method comprising the steps of:

connecting a probe to a point in said network selected for monitoring, said probe including a control processor unit (CPU) responsive in Kernel Mode for receiving an interrupt each time a data packet is received by a network interface card (NIC) of said probe, said NIC generating said interrupt for terminating present processing of said CPU for transferring data packets to either a buffer memory for access for low detail processing by said CPU programmed to operate in the Kernel Mode, or to a frame capture memory for high detail processing by said CPU programmed via Expert Analyzer software to operate in a User Mode, said User Mode normally having lower priority than said Kernel Mode; and allocating CPU time via programming said CPU, responsive to said Expert Analyzer software being enabled, to increase the allocation of percentage of available CPU time to User Mode processing as the amount of unanalyzed data in said frame capture memory increases.

2. The method of claim 1, wherein said step of allocating CPU time is performed in the Kernel Mode.

3. The method of claim 1, wherein said step of allocating CPU time includes the steps of:

determining the percentage of unanalyzed data in said frame capture memory relative to the total available memory space thereof; and basing the allocation of percent of CPU time for the User Mode upon the determined percentage of unanalyzed data falling within a given one of a plurality of percentage ranges.

4. The method of claim 3, wherein the allocation basing uses a percentage of unanalyzed data in the frame capture memory of 0–10%, 10–50%, 50–75%, 75–90% and 90–100%; with a CPU percentage allocated to kernel mode frame processing of 85%, 50%, 30%, 15% and 10%; respectively.

5. The method of claim 1, wherein said CPU is initialized to have a 90% allocation of its time to Kernel Mode processing of data.

6. The method of claim 4, wherein said CPU is initialized to have a 90% allocation of its time to Kernel Mode processing of data.

7. The method of claim 1, further including the step of calculating the maximum number of processor ticks consumed for each system tick by Kernel Mode processing.

8. The method of claim 5, further including the steps of:
monitoring the enablement of the Expert Analyzer Software; and returning the allocation of CPU time for the Kernel Mode to 90%.

9. The method of claim 6, further including the steps of:
monitoring the enablement of the Expert Analyzer Software; and returning the allocation of CPU time for the Kernel Mode to 90%.

10. The method of claim 1, further including the step of:
programming said CPU to both terminate responding to said interrupts whenever the data packet traffic rate is equal to or above said predetermined traffic rate, and to respond to a polling pulse at a predetermined polling rate while maintaining Kernel mode processing until such time that the traffic rate reduces to below said predetermined traffic rate, whereafter normal NIC interrupts are then responded to by said CPU.

11. The method of claim 10, further including the step of:
storing temporarily in a card receive buffer each data packet received by said NIC.

12. The method of claim 11, further including the step of:
transferring at the initiation of a Kernel mode of operation a data packet from said card receive buffer to a Kernel process driver, for processing by said CPU.

13. The method of claim 10, further including the step of:
terminating CPU processing of data packets whenever the time spent by said CPU in such processing exceeds a predetermined percentage of the total CPU time available between system ticks.

14. The method of claim 13, wherein the predetermined percentage value is 90%.

15. The method of claim 10, wherein said step of programming said CPU in a first mode of operation includes the initial step of:
calibrating said CPU to determine how many processor ticks are available for each system tick.

16. The method of claim 15, further including the step of:
terminating the processing of received data packets if said CPU uses greater than a predetermined percentage of the processor ticks available for each system tick.

17. The method of claim 15, further including the step of:
terminating the processing of received data packets if said CPU while processing received data packets uses greater than 90% of the processor ticks available for each system tick.

18. The method of claim 1, further including the step of:
transferring to a statistics buffer memory statistical data obtained from said CPU processing a data packet.

19. A method for monitoring and analyzing data flow at a point in a network to which a plurality of devices are connected, said method comprising the steps of:
connecting a probe to a point in said network selected for monitoring, said probe including a central processor unit (CPU) responsive in Kernel mode for receiving an interrupt each time a data packet is received by a network interface card (NIC) of said probe, said NIC generating said interrupt for terminating present processing of said CPU for transferring data packets for processing in the Kernel mode;
programming said CPU to respond to said interrupts for data packet processing at times when said NIC is receiving data packets below a predetermined traffic rate;
programming said CPU to both terminate responding to said interrupts whenever the data packet traffic rate is equal to or above said predetermined traffic rate, and to respond to a polling pulse at a predetermined polling rate while maintaining Kernel mode processing until such time that the traffic rate reduces to below said predetermined traffic rate, whereafter normal NIC interrupts are then responded to by said CPU;
transferring unanalyzed data from said NIC to a frame capture memory;
enabling software in a User mode for progressively analyzing data in said frame capture memory;
monitoring the percentage of unanalyzed data in said frame capture memory relative to the total storage capacity thereof at any given time; and
allocating the percentage of CPU (central processing unit) time for Kernel mode frame processing as a function of the percentage of unanalyzed data in said frame capture memory.

20. The method of claim 19, wherein said allocating step is made with a percentage of unanalyzed data in the frame capture memory of 0–10%, 10–50%, 50–75%, 75–90% and 90–100%; with a CPU percentage allocated to kernel mode frame processing of 85%, 50%, 30%, 15% and 10%; respectively.

21. The method of claim 19, further including the steps of:
monitoring the enablement of said software for analyzing data in said frame capture memory; and
allocating 90% of CPU time for the Kernel Mode upon disablement of said software for analyzing data in said frame capture memory.

22. The method of claim 19, further including after said probe connecting step, the steps of initializing said CPU to allocate 90% of its time to Kernel mode processing of data.

23. An apparatus for analyzing network data packets, comprising:
a network interface card for receiving data packets from the network, said network interface card comprising a card receive buffer memory for temporary storage of said data packets, said network interface card being adapted to generate a receive interrupt upon receiving a data packet;
a central processor (CPU) for running a first process for analyzing network data packets, and a second process for other than analyzing network data packets in one mode of operation, said first process being for accessing the data packets in said card receive buffer memory, and transporting the data packets to a secondary buffer for access and processing by said second process;
a frame capture memory for receiving unanalyzed data from said secondary buffer via said first process; and
expert analyzer software for, when enabled, programming said CPU for analyzing data in said frame capture memory using said second process in a second mode of operation;
wherein said first process is run in a Kernel mode, and said second process is run in a User mode, said central processor granting a higher running priority to said Kernel mode than to said User mode;
wherein, when the rate of data packets entering said card receive buffer is less than a predetermined traffic rate, said first process transports packet data from said receive buffer to said secondary buffer responsive to each receive interrupt generated by said network interface card;
wherein, when die rate of data packets entering said card receive buffer exceeds said predetermined traffic rate, said first process transports data packets from said card receive buffer to said secondary buffer at regular predetermined intervals independent of any receive interrupts generated by said network interface card; and
wherein, when the percentage of unanalyzed data in said frame capture memory relative to the total storage capacity thereof is within a predetermined range, said first process determines the percent allocation of CPU time available for Kernel mode processing in accordance with the percentage of said unanalyzed data, whenever said expert analyzer software is enabled.

24. The apparatus of claim 23, further including said central processor being programmed to terminate said first process and transfer to said second process whenever the time spent in said first process exceeds a predetermined percentage of the time available between system ticks.

25. The apparatus of claim 23, further including said central processor being programmed to terminate said first process and transfer to said second process whenever the time spent in said first process exceeds 90% of the time available between system ticks.

26. The apparatus of claim 23, wherein said first process allocates with a percentage of unanalyzed data in the frame capture memory of 0–10%, 10–50%, 50–75%, 75–90% and 90–100%; with a CPU percentage allocated to kernel mode frame processing of 85%, 50%, 30%, 15% and 10%; respectively.

27. In a method for monitoring and analyzing the flow data packets at a point in a network to which a plurality of objects and/or devices are connected, a probe includes a network interface card (NIC) having an input for connection to said point in said network for receiving said data packets, and an interrupt generator for generating an interrupt at the time of receipt of each data packet, said probe further including a central processor unit (CPU) programmed to run in a high priority first mode for an associated operating system, for applications programs for analyzing said data packets, said CPU normally being responsive to each interrupt for accessing a data packet for low detail analysis, said CPU being programmed to run in a relatively low priority second mode for other applications, and for detailed analysis of said data packets, wherein the improvement to said method comprises the steps of:

programming said CPU in said first mode of operation to respond to said interrupts at times when said NIC is receiving data packets below a predetermined traffic rate for the flow of data packets at said point in said network;

programming said CPU in a said first mode of operation to both terminate responding to said interrupts whenever the data packet traffic rate is equal to or above said predetermined traffic rate, and to respond to a polling pulse at a predetermined traffic rate, whereafter normal NIC interrupts are then responded to by said CPU;

transferring data packets upon receipt for detailed analysis to a frame capture memory; and allocating a greater percentage of CPU time to said second mode as a function of the amount of unanalyzed data in said frame capture memory increasing from one level to a higher level.

28. The method of claim 27, further including the step of:
terminating the processing of received data packets if the time spent by said CPU for said processing exceeds a predetermined percentage of the CPU time available between operating system ticks.

29. The method of claim 27, further including the step of:
terminating the processing of a received data packet if the time spent by said CPU performing such processing exceeds 90% of the CPU time available between operating system ticks.

30. The method of claim 27, wherein said allocating step makes allocations with a percentage of unanalyzed data in the frame capture memory of 0–10%, 10–50%, 50–75%, 75–90% and 90–100%; with a CPU percentage allocated to kernel mode frame processing of 85%, 50%, 30%, 15% and 10%; respectively.

* * * * *